(12) United States Patent
Hanamoto et al.

(10) Patent No.: US 8,675,262 B2
(45) Date of Patent: Mar. 18, 2014

(54) IMAGE READING DEVICE AND IMAGE FORMING APPARATUS INCLUDING THE SAME

(75) Inventors: Katsuhiko Hanamoto, Osaka (JP); Takehiko Okada, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 543 days.

(21) Appl. No.: 12/971,770

(22) Filed: Dec. 17, 2010

(65) Prior Publication Data

US 2011/0235131 A1    Sep. 29, 2011

(30) Foreign Application Priority Data

Mar. 25, 2010   (JP) .................................. 2010-069156
Mar. 25, 2010   (JP) .................................. 2010-069158

(51) Int. Cl.
    *H04N 1/04* (2006.01)
(52) U.S. Cl.
    USPC ........... 358/474; 358/471; 358/496; 358/497; 358/498; 399/379; 399/380
(58) Field of Classification Search
    None
    See application file for complete search history.

(56) References Cited

U.S. PATENT DOCUMENTS

| 5,748,293 | A * | 5/1998 | Crawford et al. ................ 355/75 |
| 6,408,161 | B1 * | 6/2002 | Minowa et al. ................ 399/380 |
| 8,018,628 | B2 * | 9/2011 | Kurokawa et al. ............ 358/471 |
| 2007/0153120 | A1 | 7/2007 | Kajikawa et al. | |

FOREIGN PATENT DOCUMENTS

| JP | 2-76612 | 3/1990 |
| JP | 7-219288 | 8/1995 |
| JP | 11-261742 | 9/1999 |
| JP | 2000-352682 | 12/2000 |
| JP | 2002-44368 | 2/2002 |
| JP | 2002-131852 | 5/2002 |
| JP | 2003-4027 | 1/2003 |
| JP | 2003-4027 A | 1/2003 |
| JP | 2007-131852 | 6/2007 |
| JP | 2007-166215 A | 6/2007 |
| JP | 2007-166291 | 6/2007 |
| JP | 2007-306411 | 11/2007 |
| JP | 2007-306411 A | 11/2007 |
| JP | 2008-61058 | 3/2008 |
| JP | 2010-61108 | 3/2010 |

* cited by examiner

*Primary Examiner* — Cheukfan Lee
(74) *Attorney, Agent, or Firm* — Smith, Gambrell, & Russell, LLP

(57) ABSTRACT

A position adjustment mechanism (90) includes a rack (91) fixed onto an upper surface of a second hinge member (87), a worm gear 93 that meshes with the rack (91), a handle (95) that rotates the worm gear (93), and a lever (97) that presses the second hinge member (87) against the first hinge member (85) to fix the second hinge member (87) to the first hinge member (85). The lever (97) is operated to release the pressure on the second hinge member (87) so that the handle (95) is operated, to thereby adjust a tilt of the document conveying device (27) with respect to the image reading portion (6) without using a tool and the like. After the adjustment, the lever (97) is operated to press the second hinge member (87), to thereby position the document conveying device (27) precisely at a position after the adjustment.

10 Claims, 8 Drawing Sheets

IMAGE READING DEVICE AND IMAGE FORMING APPARATUS INCLUDING THE SAME

This application is based upon and claims the benefit of priority from the corresponding Japanese Patent Application No. 2010-69156 filed on Mar. 25, 2010 and Japanese Patent Application No. 2010-69158 filed on Mar. 25, 2010, the entire contents of which are incorporated herein by reference.

BACKGROUND OF THE INVENTION

1. Field of the Invention

The present invention relates to an image reading device that scans and reads a document, used in a digital copier, an image scanner, and the like, and an image forming apparatus including the image reading device. In particular, the present invention relates to a sheet-through type image reading device that conveys a document and reads an image.

2. Description of Related Art

Conventionally, there is an image reading device mounted on a multifunction peripheral or the like employing an electrophotographic process, which includes a document conveying device (automatic document feeder) that sequentially feeds sheet-shaped documents to a document placing table (image reading portion) so as to read the documents and discharges the documents from the document placing table after finishing reading the documents. In such an image reading device, two kinds of reading systems may be employed: a sheet-through system in which a document is automatically conveyed by the document conveying device and read with a document holder closed; and a document fixing system in which a document holder is opened/closed for each reading so as to replace a document on the document placing table (contact glass) one by one, and an optical system (scanning means) is moved to read the document. According to the sheet-through system, a reading operation of a document is performed while the optical system in the image reading device is held at a predetermined image reading position without being moved for scanning. On the other hand, according to the document fixing system, the optical system thereof is moved for scanning to thereby perform a reading operation.

In the image reading device employing the sheet-through system described above, when a document is conveyed obliquely with respect to an image reading position, an image to be read is also tilted. In view of this, various methods of adjusting the tilt of the document conveying direction of the document conveying device with respect to the image reading device body have been proposed. For example, there is known an image reading device, in which the document conveying device is connected to the image reading device so as to be displaceable at a first attachment portion that connects the document conveying device to the image reading device while the document conveying device is connected to the image reading device as to be rotatable at a second attachment portion, and fixing means for fixing the document conveying device to a position where the displacement is performed at the first attachment portion is provided.

Further, there is known a document processing device, in which an adjustment bolt for adjusting the tilt of a document conveying device is provided at one place of two hinge portions supporting the document conveying device, and an operation head of the adjustment bolt is placed on a front side of the hinge portion. Further, there is known an image processing device, in which a stay that may be freely opened/closed is provided on a document reading portion, a conveying unit is attached rotatably on the stay, and a positioning mechanism is provided at a rotation end portion of the conveying unit so as to adjust the tilt of the conveying unit with respect to the stay.

However, according to the method in which the document conveying device is connected to the image reading device so as to be displaceable at the first attachment portion while the document conveying device is connected so as to be rotatable with respect to the image reading device at the second attachment portion, and the document conveying device is fixed at the position where the displacement is performed at the first attachment portion, it is necessary to first loosen a screw for fixing a hinge portion to adjust the tilt of the document conveying device with respect to the image reading device, and then fasten the screw, which requires time for adjustment and a tool such as a driver.

On the other hand, according to the method in which an adjustment bolt for adjusting the tilt of the document conveying device is provided, a manual operation is enabled by knurling an operation head of the adjustment bolt. However, in order to fix the position after adjustment, it is necessary to fasten a loose preventing nut, and thus, the position adjustment operation is far from easy. Further, according to the method in which a stay that may be opened/closed freely is provided on the document reading portion while the conveying unit is attached rotatably on the stay, and a positioning mechanism is provided at the rotation end portion of the conveying unit to adjust the tilt of the conveying unit with respect to the stay, a method of fixing the position of the conveying unit after adjustment is unknown. Further, the stay is interposed between the conveying unit and the document reading portion, and hence there is a problem that a parts count and the number of assembly steps increase.

SUMMARY OF THE INVENTION

In view of the above-mentioned problems, it is an object of the present invention to provide an image reading device capable of adjusting a tilt of a document conveying device easily and fixing the position of the document conveying device after the adjustment easily and precisely, and an image forming apparatus including the image reading device.

In order to achieve the above-mentioned object, an image reading device according to an aspect of the present invention includes: a contact glass on which a document is to be placed; a document conveying device that is capable of being opened upward and closed with respect to the contact glass, and conveys a document to an upper surface of the contact glass; an image reading portion that is provided below the contact glass and reads an image of a document placed on the contact glass or an image of a document conveyed to an image reading position by the document conveying device; and a pair of hinge portions that hold the document conveying device so as to be rotatable with respect to the image reading portion, in which at least one of the hinge portions includes a hinge base supported by the image reading portion, a first hinge member connected rotatably to the hinge base, and a second hinge member that is supported by the first hinge member so as to be slidable in a direction perpendicular to a rotary shaft with respect to the first hinge member and fixed to the document conveying device. The image reading device further includes a position adjustment mechanism including a lever that applies a pressure on the second hinge member so as to press the second hinge member against the first hinge member or releases the pressure, a gear mechanism that allows the second hinge member to slide with respect to the first hinge member in a state in which the pressure on the second hinge member is released through the lever, and a handle that rotates the gear mechanism.

Further features and advantages of the present invention will become apparent from the description of embodiments given below.

BRIEF DESCRIPTION OF THE DRAWINGS

FIG. 11 is a plan view from above of the hinge portion 80a.

DETAILED DESCRIPTION OF PREFERRED EMBODIMENTS

Figure 1:
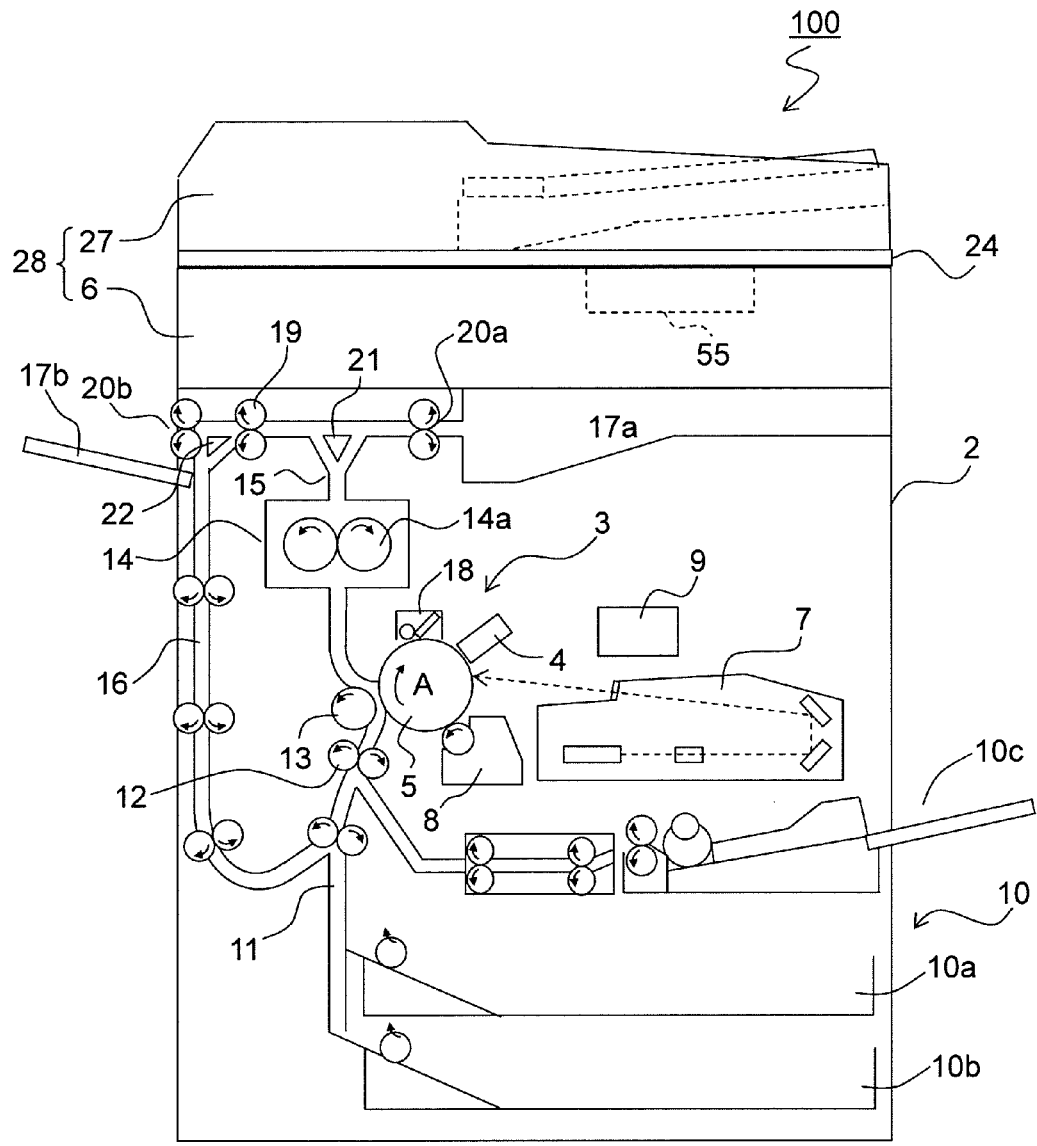
FIG. 1 is a side cross-sectional view illustrating an entire configuration of an image forming apparatus having an image reading device according to an embodiment of the present invention.

Hereinafter, an embodiment of the present invention is described with reference to the drawings. FIG. 1 is a schematic structural view of an image forming apparatus having an image reading device according to an embodiment of the present invention. In FIG. 1, when an image forming apparatus 100 (herein, a digital multifunction peripheral is illustrated as an example) performs a copying operation, an image reading portion 6 described later reads image data on a document and converts the image data into an image signal. On the other hand, in an image forming portion 3 in a multifunction peripheral body 2, a photosensitive drum 5 that rotates in the direction of A of FIG. 1 is charged uniformly by a charging unit 4. Then, an electrostatic latent image is formed on the photosensitive drum 5 with a laser beam from an exposure unit (laser scanning unit, or the like) 7, based on the document image data read in the image reading portion 6, and a developing unit 8 causes a developer (hereinafter, referred to as toner) to adhere to the electrostatic latent image, to thereby form a toner image. The toner is supplied to the developing unit 8 from a toner container 9.

A sheet is conveyed from a sheet feeding mechanism 10 to the image forming portion 3 via a sheet conveying path 11 and a registration roller pair 12 so that the sheet is conveyed toward the photosensitive drum 5 on which the toner image has been formed as described above, and the toner image on the surface of the photosensitive drum 5 is transferred to the sheet by a transfer roller 13 (image transfer portion) in the image forming portion 3. Then, the sheet with the toner image transferred thereonto is separated from the photosensitive drum 5, conveyed to a fixing portion 14 having a fixing roller pair 14a so that the toner image is fixed thereon. The sheet having passed through the fixing portion 14 is sent to a sheet conveying path 15 branched in a plurality of directions, so that a conveying direction of the sheet is sorted by path switching mechanisms 21, 22 having a plurality of path switch guides provided at branching points of the sheet conveying path 15. The sorted sheet is discharged to a sheet discharge portion including a first discharge tray 17a and a second discharge tray 17b directly (or after being sent to the sheet conveying path 16 for double-side copying).

Further, a dielectrifying device (not shown) that removes residual charge on the surface of the photosensitive drum 5 is provided on a downstream side of a cleaning device 18. Further, the sheet feeding mechanism 10 includes a plurality of sheet feeding cassette 10a, 10b receiving sheets and detachably attached to the multifunction peripheral body 2, and a stack bypass (manual sheet feeding tray) 10c provided above the sheet feeding cassettes 10a, 10b. The sheet feeding mechanism 10 is connected to the image forming portion 3 formed of the photosensitive drum 5, the developing unit 8, and the like via the sheet conveying path 11.

The image reading portion 6 is disposed in an upper portion of the apparatus body. A platen (document holder) 24 pressing and holding a document placed on the contact glass 25 (see FIG. 4) of the image reading portion 6 is provided so as to be opened/closed on an upper surface of the apparatus body, and a document conveying device 27 is provided on the platen 24. The image reading portion 6 and the document conveying device 27 constitute the image reading device 28.

Specifically, the sheet conveying path 15 is branched first into the right and left on a downstream side of the fixing roller pair 14a, and one of the paths (path branched in a right direction in FIG. 1) is communicated to the first discharge tray 17a. On the other hand, the other path (path branched in a left direction in FIG. 1) is branched into two paths via a conveying roller pair 19, and one of the branched paths (path branched in a left direction in FIG. 1) is communicated to the second discharge tray 17b. In contrast, the other path (path branched in a downward direction in FIG. 1) is communicated to the sheet conveying path 16.

Figure 2:
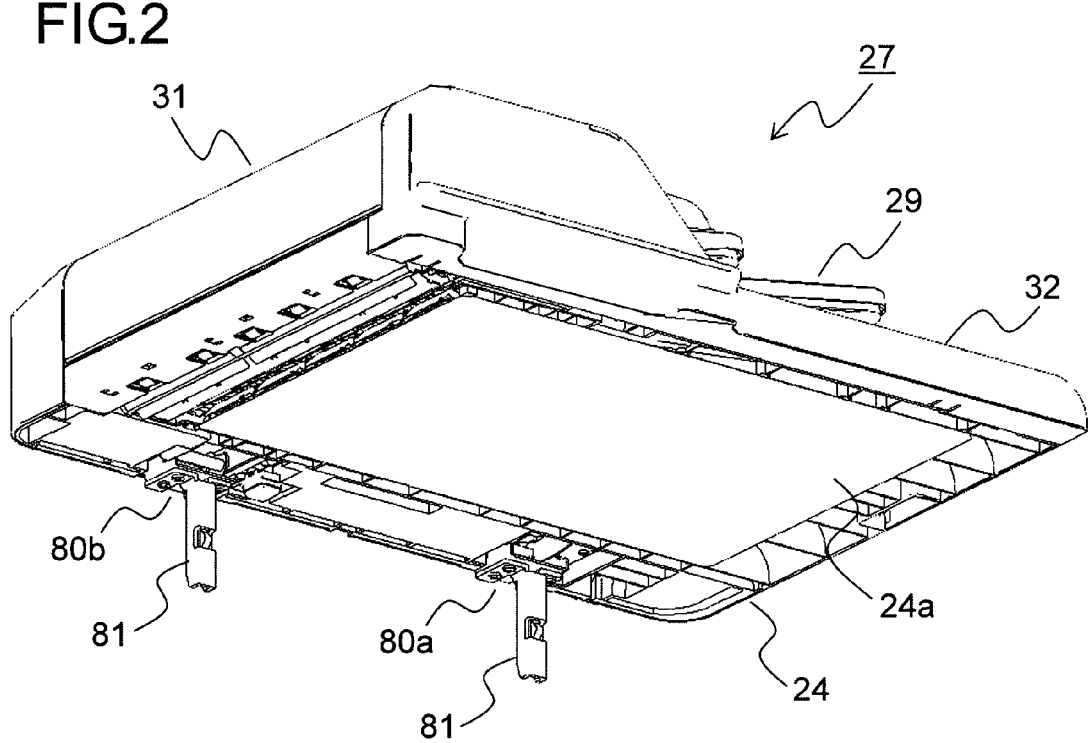
FIG. 2 is an external perspective view from below of the document conveying device of the image reading device according to an embodiment of the present invention.
Figure 3:
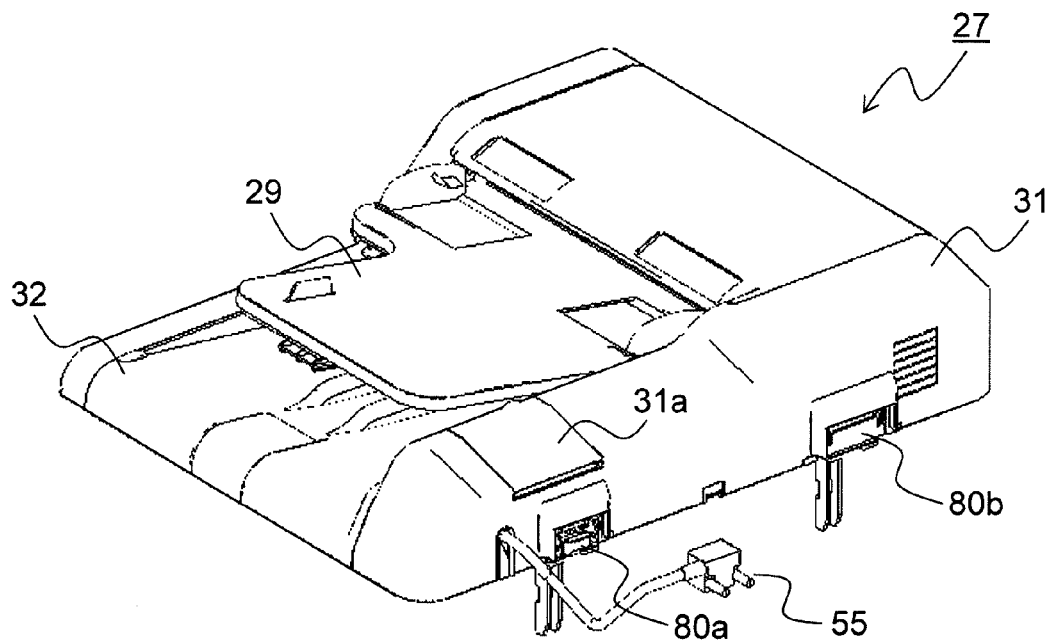
FIG. 3 is an external perspective view from above of the document conveying device of the image reading device according to an embodiment of the present invention.

FIGS. 2 and 3 are external perspective views from below and above, respectively, of the document conveying device mounted on the image reading device according to an embodiment of the present invention. The document conveying device 27 includes a document feed tray 29 having a document guide 29a for aligning and placing a plurality of documents, and an inversion tray 30 (see FIG. 6) provided below the document feed tray 29. The document feed tray 29 and the inversion tray 30 are attached to a frame of the document conveying device 27.

Further, a cover member 31 is supported by the frame of the document conveying device 27 so as to be opened/closed, by taking one end (lower left of FIG. 2) as a rotary fulcrum. A document conveying path d (see FIG. 6) is opened by opening the cover member 31, so that jam clearance processing may be performed. On the side of the cover member 31, a document discharge tray 32 is formed directly as part of an upper surface of the platen 24. The platen 24 is supported rotatably by one end of the upper surface of the image reading portion 6 by the hinge portions 80a, 80b in two places, and hinge legs 81 are provided so as to be attached to a lower portion of the hinge portions 80a, 80b.

A document mat 24a that covers and holds substantially an entire surface of a document placed on the contact glass 25 (see FIG. 5) is provided on the reverse surface of the platen 24. The document mat 24a is generally formed of a sheet member, a sponge, and the like, and the document mat 24a is compressed with a load of the platen 24 to hold the document on the contact glass 25 securely.

As illustrated in FIG. 3, the cover member 31 has an outer lid 31a provided at a position immediately above the hinge portion 80a, and an accommodating concave portion 98 (see FIG. 4) is formed below the outer lid 31a. Further, a connector 55 connected to the body of the image forming apparatus 100 extends over a back surface side of the cover member 31. The connector 55 supplies power from the body of the image forming apparatus 100 to the document conveying device 27, and a control signal is transmitted/received between the document conveying device 27 and a control portion (not shown) of the body of the image forming apparatus 100 via the connector 55.

Figure 4:
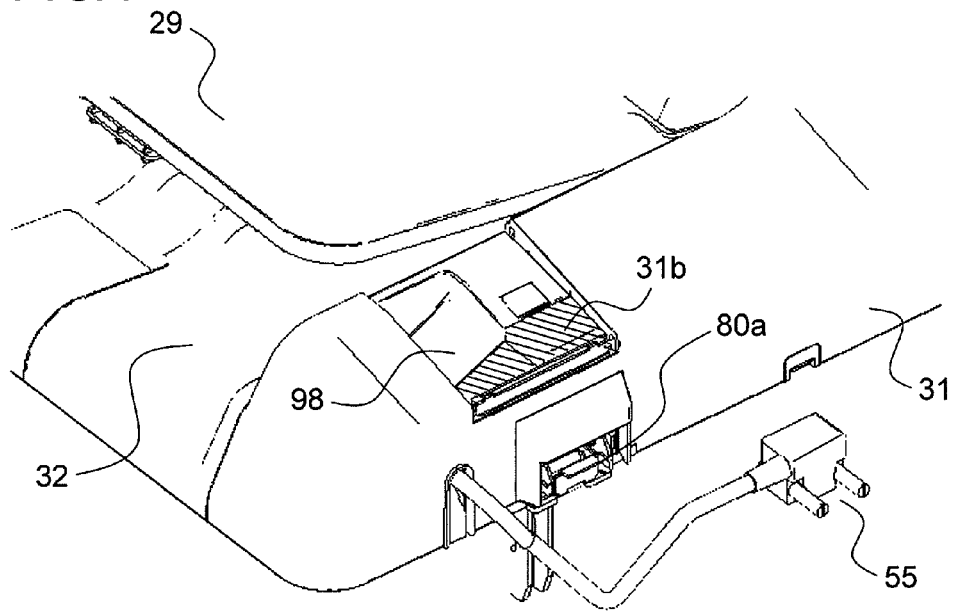
FIG. 4 is a partially enlarged view illustrating a state in which an outer lid of a cover member of the document conveying device is removed.

FIG. 4 is a partially enlarged view of the vicinity of the accommodating concave portion 98 with the outer lid 31a of the cover member 31 removed. The accommodating concave portion 98 accommodates a pad for cleaning the contact glass 25 and a clip, a staple, and the like removed from documents. Further, an inner lid 31b (hatched portion of FIG. 4) for opening a part of the bottom surface of the accommodating concave portion 98 is provided. The inner lid 31b is opened so as to open the upper side of the hinge portion 80a.

Figure 5:
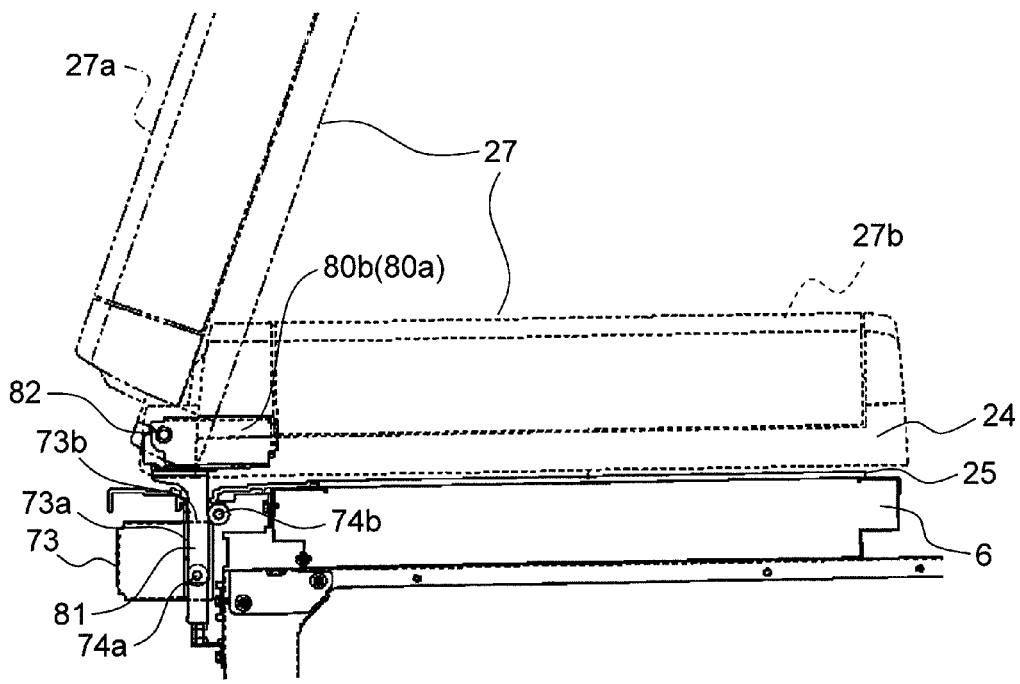
FIG. 5 is a side cross-sectional view of the periphery of a hinge portion of the image reading device according to an embodiment of the present invention.

FIG. 5 is a side cross-sectional view illustrating a configuration of the periphery of the hinge portion of the document conveying device mounted on the image reading device according to an embodiment of the present invention. In FIG. 5, the document conveying device 27 is configured so as to be rotatable from a posture 27a of an open state to a posture 27b of a closed state, around a rotary fulcrum 82 of the hinge portions 80a, 80b, with respect to the body of the image reading device 6. A detailed configuration of the rotation portion of the hinge portions 80a, 80b is described later.

The hinge portions 80a, 80b are configured in the following manner: when a thick document such as a book is placed on the contact glass 25 and the document conveying device 27 is closed, hinge legs 81 provided below the hinge portions 80a, 80b move in a vertical direction, without moving in a horizontal direction due to a back side guide surface 73a, a side guide surface 73b, and bearings 74a, 74b. The movement of the hinge portions 80a, 80b in the front and back direction (right and left direction of FIG. 5), which receives a large load due to a moment resulting from the weight of the document conveying device 27, is guided by the bearings 74a, 74b so that the hinges 80a, 80b may smoothly move up and down.

Figure 6:
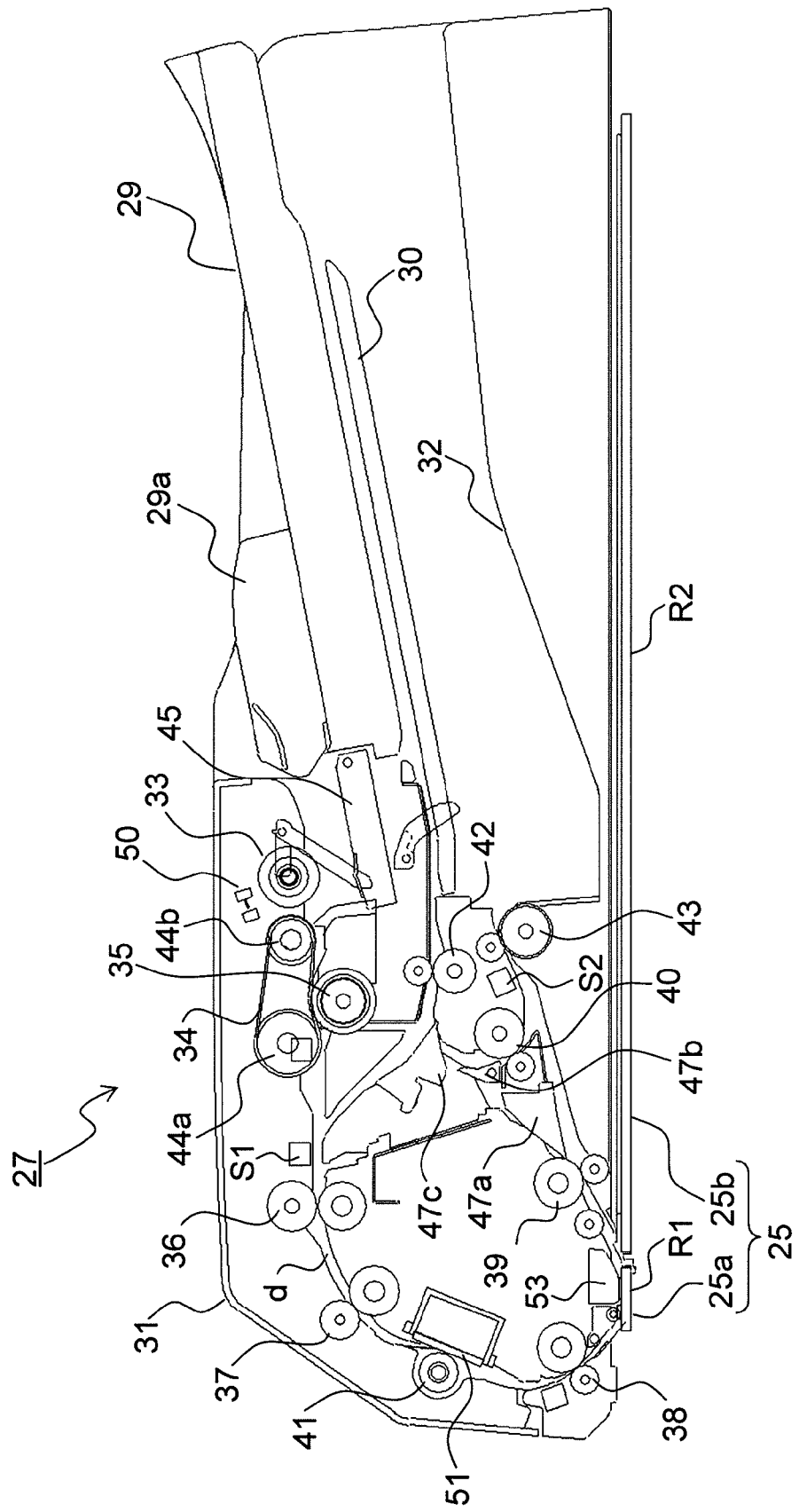
FIG. 6 is a side cross-sectional view illustrating an internal structure of the document conveying device of the image reading device according to an embodiment of the present invention.

FIG. 6 is a side cross-sectional view illustrating an internal structure of the document conveying device. In the cover member 31, a document conveying path d extending from the document feed tray 29 to the document discharge tray 32 is formed. Along the document conveying path d, document conveying members including a pickup roller 33, a sheet feeding belt 34, a separation roller 35, a registration roller pair 36, conveying roller pairs 37, 38, 39, and 40, a CIS roller 41, an inversion roller pair 42, a discharge roller pair 43, and the like are provided.

The sheet feeding belt 34 is wound around a drive roller 44a and a driven roller 44b, and a separation roller 35 is in contact with the sheet feeding belt 34 from below with a predetermined pressure. The separation roller 35 incorporates a torque limiter. The separation roller 35 rotates in an opposite direction to that of the sheet feeding belt 34 only in the case where the rotation load falls short of a predetermined torque, and rotates following the sheet feeding belt 34 in the case where the rotation load exceeds the predetermined torque. An upper surface detection sensor 50 that detects the position of the upper surface of a document is placed above the pickup roller 33.

The contact glass 25 includes the glass for automatic reading 25a and a glass for a hand-placed document 25b, and is provided with a white reference plate (not shown) for shading correction placed as being opposed to the glass for automatic reading 25a and a document pressing portion (not shown) placed above the white reference plate, for pressing the white reference plate against the glass for automatic reading 25a. The document conveying path d extends from the registration roller pair 36 as being curved so as to be reversed when arriving at the glass for automatic reading 25a. Further, on the document conveying path d, a plurality of sheet detection sensors including a sheet feeding sensor S1 and a discharge sensor S2 for detecting the presence/absence of a document or the passage of a document are disposed at suitable places.

Next, a sheet-through type document conveying operation using the document conveying device 27 is described. In the sheet-through system, when a copying start button of an operation panel (display means) 55 (see FIG. 1) of the image forming apparatus 100 is pressed after a plurality of documents are set on the document feed tray 29 with image surfaces faced up, a lift plate 45 raised by an elevation mechanism (not shown) pushes up the pickup roller 33 via the documents, and the weight of a frame (not shown) including the pickup roller 33 is applied to the lift plate 45. As a result, the upper surface of the document is pressed against the pickup roller 33 with a predetermined pressure (sheet feeding pressure).

Herein, the pickup roller 33, the drive roller 44a, the driven roller 44b, and the sheet feeding belt 34 are disposed in a frame (not shown). Further, the pickup roller 33 is connected to the drive roller 44a via a gear (not shown). When the drive roller 44a is rotated by a roller drive motor (not shown), the sheet feeding belt 34 suspended across the drive roller 44a and the driven roller 44b is rotary-driven, and the pickup roller 33 is also rotary-driven.

Generally, a plurality of documents from the top of the documents set on the document feed tray 29 are sent to a nip portion of the sheet feeding belt 34 and the separation roller 35 by the pickup roller 33. Then, only the uppermost one of the plurality of documents is separated by the separation roller 35 and conveyed to the registration roller pair 36. At this time, after the document is conveyed by a predetermined distance after the tip end of the document is detected by the sheet feeding sensor S1, the rotary-drive of the pickup roller 33 and the sheet feeding belt 34 are stopped due to the stop of the operation of the roller drive motor, and thus, the primary sheet feeding is completed. The tip end of the document fed through the primary sheet feeding is stopped in a state in which the nip portion of the registration roller pair 36 is warped.

After a lapse of a predetermined time from the completion of the primary sheet feeding, secondary sheet feeding is started. Specifically, the registration roller pair 36 is rotary-driven due to the operation of a secondary sheet feeding drive motor (not shown). The document is conveyed to the discharge roller pair 43 through the glass for automatic reading 25a by the registration roller pair 36, the conveying roller pairs 37 to 39, and the CIS roller 41, and then finally discharged onto the document discharge tray 32 by the discharge roller pair 43. At this time, the completion of reading of an image of one document is detected when the discharge sensor S2 detects the passage of a trailing end of the document.

Herein, the discharge sensor S2 has a count function of counting the number of documents every time the conveyance of the documents is completed. When the sheet feeding sensor S1 detects a follow-on document, the second and the subsequent documents are continued to be conveyed in the same way as described above. When a document comes into contact with the conveying guide 53 while passing by the glass for automatic reading 25a, the document is conveyed while being lightly pressed from above toward the glass for automatic reading 25a, and an image of the document is read by the image reading portion 6 (see FIG. 1) through the glass for automatic reading 25a.

Further, as a method of reading both surfaces of a document, there are a one-stage reading method and a two-stage reading method. According to the one-stage reading method, an image of a back surface of a document is read by a contact image sensor 51 provided as being opposed to the CIS roller 41, and an image of a front surface of the document is read through the glass for automatic reading 25a. On the other hand, according to the two-stage reading method, after an image of a front surface of a document is read through the glass for automatic reading 25a, the document is distributed to the inversion tray 30 by branching hooks 47a, 47b, and 47c, and the inversion roller pair 42 is inverted so that the document is conveyed again to an upstream side of the registration roller pair 36 with the back surface of the document faced up, to thereby allow an image of the back surface of the document to be read through the glass for automatic reading 25a.

Although reading by the contact image sensor 51 may shorten a reading time, it is inferior to reading through the glass for automatic reading 25a in terms of image quality. Therefore, it is preferred to use the one-stage reading method using the contact image sensor 51 in the case of documents including characters or the like, and to use the two-stage reading method using the inversion tray 30 in the case where reading of high image quality with high-definition is required as in documents including pictures.

In the case of using the two-stage reading method, when documents after being read are successively discharged directly to the document discharge tray 32, the discharged documents are placed with the front and back sides inverted with respect to the state in which the documents are set on the document feed tray 29. Thus, after an image of a back surface of a document is read through the glass for automatic reading 25a, the document is introduced onto the inversion tray 30 by shaking the branching hooks 47a to 47c, and the document is discharged to the document discharge tray 32 via the conveying roller pair 40 and the discharge roller pair 43. With this configuration, the front and back sides of each document are inverted again before the document is discharged, and hence, the documents may be placed on the document discharge tray 32 while keeping the state at a time when the documents are set on the document feed tray 29.

Figure 7:
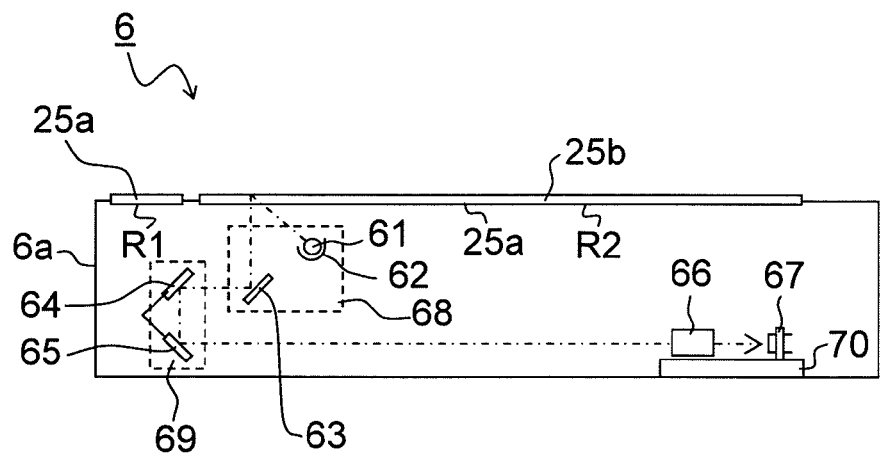
FIG. 7 is a side cross-sectional view illustrating an internal structure of an image reading portion of the image reading device according to an embodiment of the present invention.

Next, the configuration of the image reading portion 6 for reading an image of a document as an electric signal is described. FIG. 7 is a side cross-sectional view illustrating an internal structure of an image reading device according to an embodiment of the present invention. In a frame 6a of the image reading portion 6, a lamp (light source) 61 for irradiating an image surface of a document with light, a reflective plate 62 for efficiently giving light from the lamp 61 to the image surface of the document, a first mirror 63 for directly receiving light reflected from the document and reflecting the light, a second mirror 64 for receiving light reflected from the first mirror 63 and reflecting the light, and a third mirror 65 for receiving light reflected from the second mirror 64 and reflecting the light are disposed.

Further, a lens barrel 66 holding a lens group (not shown) for introducing and condensing light reflected from the third mirror 65, and a line-type CCD (photoelectric exchange member) sensor 67 having a photoelectric exchange element, which receives light reflected from the document and condensed by the lens group of the lens barrel 66, and converts the light into an electric signal, are disposed on a base plate 70. An optical path of the light reflected from the document is indicated by alternate long and short dashed lines.

The lamp 61, the reflective plate 62, and the first mirror 63 are fixed integrally on a first carriage 68, and further, the second mirror 64 and the third mirror 65 are fixed integrally on a second carriage 69. The first and second carriages 68 and 69 constitute scanning means and are capable of reciprocating in cooperation with each other in spite of being independent from each other.

More specifically, when the reading operation of a document image is performed in the above-mentioned sheet-through system, the first carriage 68 is moved to an area immediately below a first image reading region (image reading position) R1 of the glass for automatic reading 25a to be held, and the second carriage 69 is held at a predetermined position. On the other hand, in the document fixing system, the first carriage 68 and the second carriage 69 reciprocate (move for scanning) below a second image reading region R2 of the glass for a hand-placed document 25b while mutually maintaining an optical path length of the light reflected from the document. Further, the first carriage 68 and the second carriage 69 are driven by a carriage drive motor (not shown). Still further, the home positions of the first and second carriages 68, 69 are set immediately below the white reference plate (not shown).

With such a configuration, the light, which is irradiated from the lamp 61 and reflected from an image surface of the document, is reflected by the first to third mirrors 63 to 65 to be introduced into a lens group in the lens barrel 66, and condensed by the lens group, to thereby form an image on the CCD sensor 67. Then, the light is subjected to photoelectric exchange by the CCD sensor 67, and the document image is read as an electric signal.

Figure 8:
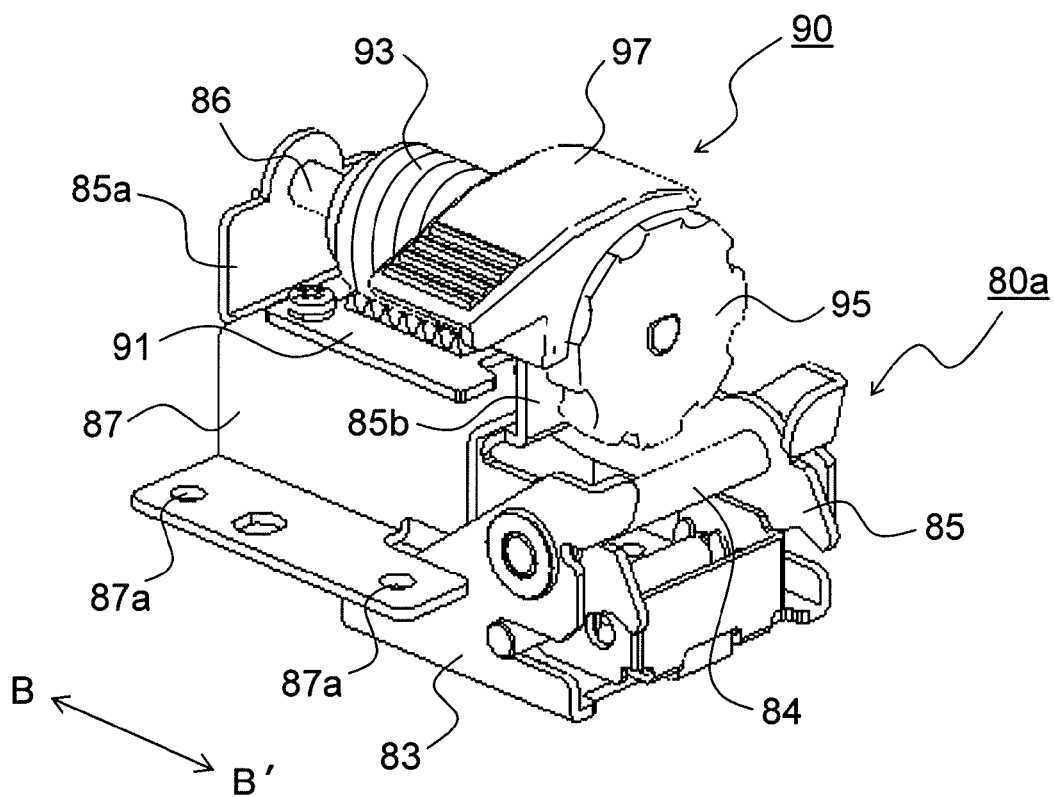
FIG. 8 is a schematic perspective view from the back of a hinge portion (hinge portion 80a on the right side viewed from the front of an image forming apparatus 100) of the image reading device according to an embodiment of the present invention.
Figure 9:
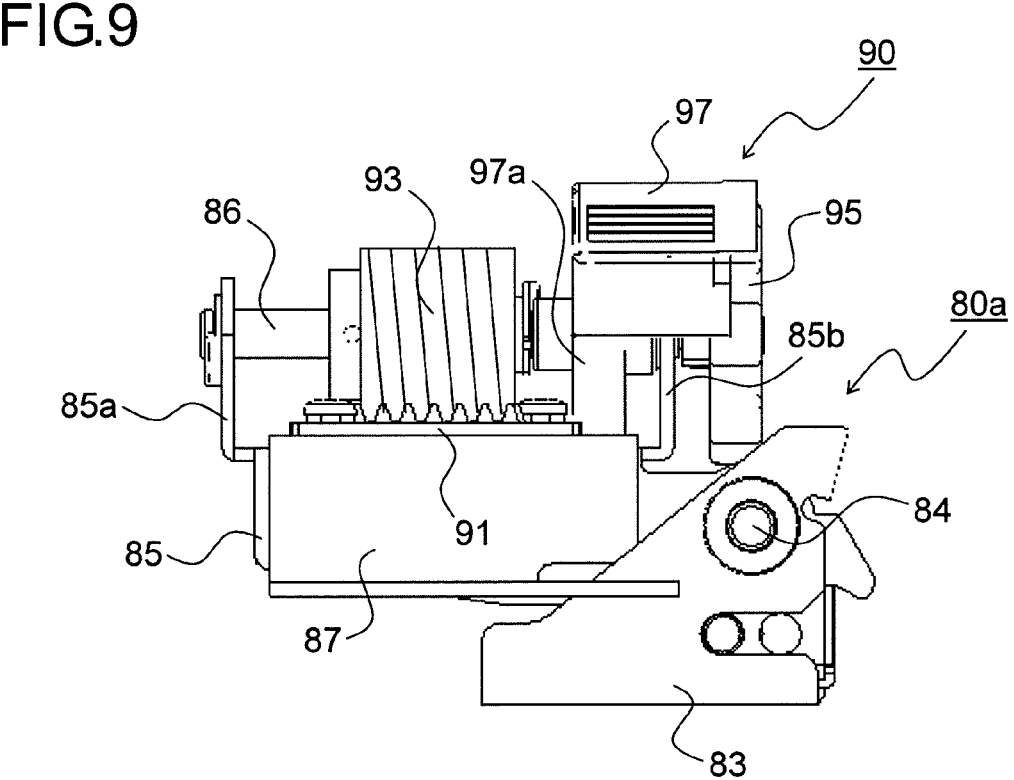
FIG. 9 is a side view of the hinge portion 80a viewed from a left front side of FIG. 8.
Figure 10:
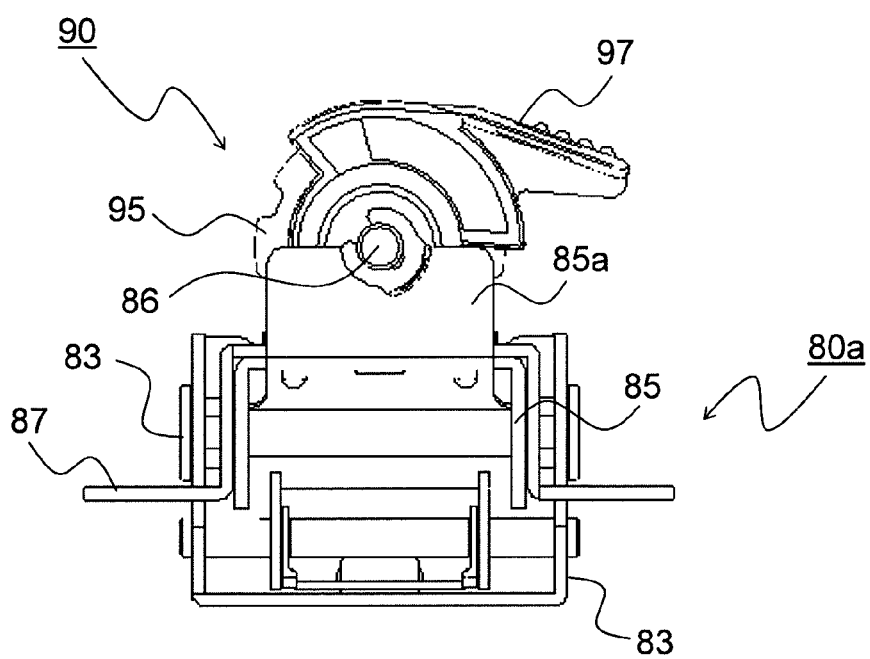
FIG. 10 is a front view of the hinge portion 80a viewed from a rotary shaft side (left side of FIG. 9).
Figure 11:
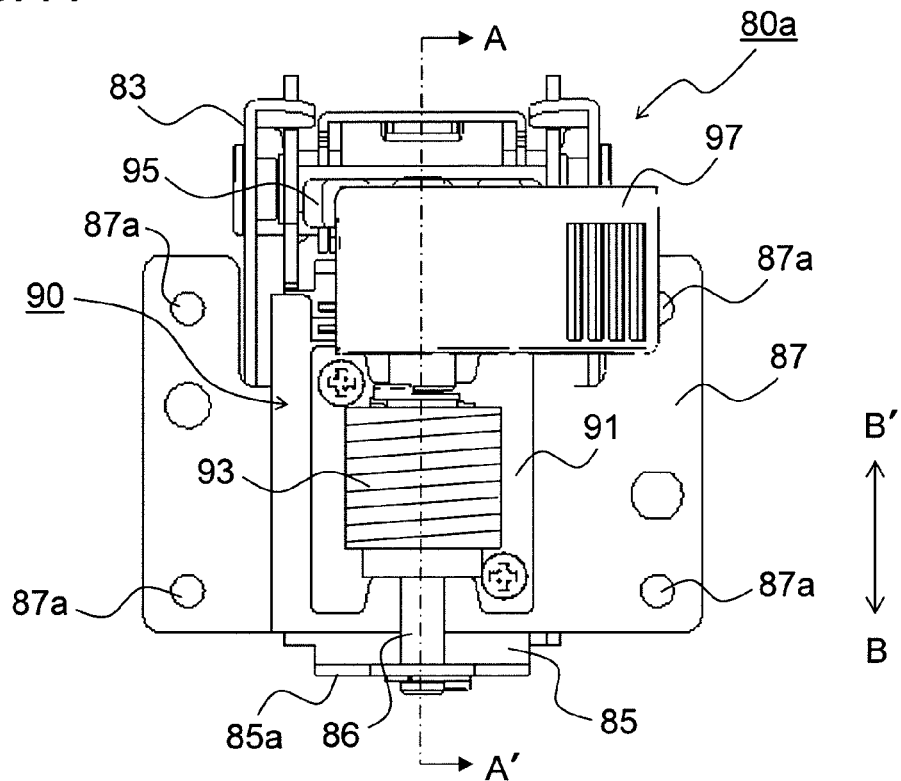
Figure 12:
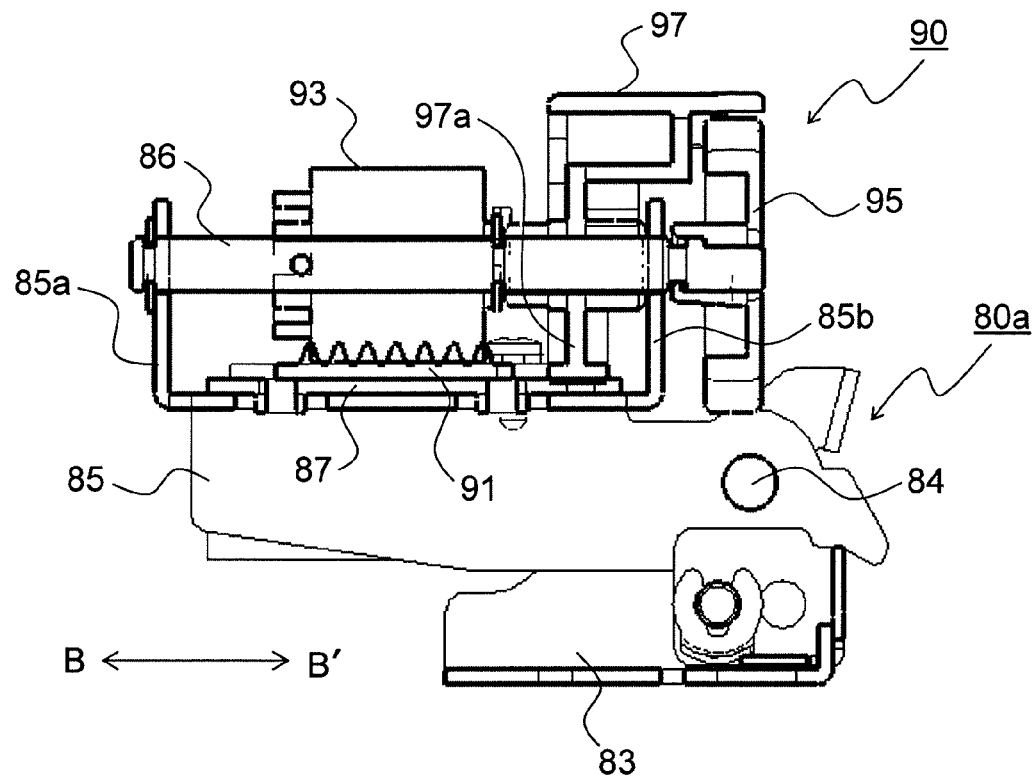
FIG. 12 is a side cross-sectional view of the hinge portion 80a (cross-sectional view taken along the line AA' of FIG. 11).

Next, the configuration of a hinge portion to be attached to the image reading device and the document conveying device is described in detail. FIG. 8 is a schematic perspective view from the back of the hinge portion (hinge portion 80a on the right side viewed from the front of the image forming device 100) to be attached to the image reading device and the document conveying device according to an embodiment of the present invention. FIG. 9 is a side view of the hinge portion viewed from the front left side of FIG. 8, FIG. 10 is a front view of the hinge portion viewed from the rotary shaft side (left side of FIG. 9), FIG. 11 is a plan view from above of the hinge portion, and FIG. 12 is a side cross-sectional view (cross-sectional view taken along the line AA' of FIG. 11) of the hinge portion.

As illustrated in the drawings, the hinge portion 80*a* has a hinge base 83 supported by a frame of the image reading portion 6 (see FIG. 7), a first hinge member 85 supported by the hinge base 83 so as to be rotatable about a spindle 84, and a second hinge member 87 supported on the upper surface of the first hinge member 85. The second hinge member 87 is provided with screw holes 87*a* for fixing the second hinge member 87 to the frame of the document conveying device 27 (see FIG. 6). Further, the second hinge member 87 is supported so as to be slidable in a direction (direction indicated by the arrow BB' of the figure) orthogonal to the document conveying direction with respect to the first hinge member 85. The hinge portion 80*a* is provided with a position adjustment mechanism 90 that adjusts the tilt of the document conveying device 27 by sliding the second hinge member 87 in the direction indicated by the arrow BB'.

The position adjustment mechanism 90 includes a rack 91 fixed on the upper surface of the second hinge member 87, a worm gear 93 that is meshed with the rack 91, a handle 95 that rotates the worm gear 93, and a lever 97 that presses the second hinge member 87 against the first hinge member 85 to fix the second hinge member 87 to the first hinge member 85. The worm gear 93 and the handle 95 are fixed onto a shaft 86, and the lever 97 is supported rotatably by the shaft 86 between the worm gear 93 and the handle 95. The shaft 86 is supported pivotably by support chips 85*a*, 85*b* rising substantially perpendicularly from the upper surface of the first hinge member 85.

The lever 97 has a cam portion 97*a* formed integrally around the shaft 86, and the cam portion 97*a* forms an eccentric cam shape whose outer diameter changes gradually from the shaft 86 to the outer circumferential surface. Specifically, when the lever 97 is pressed down as illustrated in FIGS. 8 to 12, a large diameter portion 97*aa* (see FIG. 14) having a largest outer diameter of the cam portion 97*a* comes into contact with the second hinge member 87. Further, the distance between the shaft 86 and the second hinge member 87 is designed slightly smaller than the diameter of the large diameter portion 97*aa*.

Further, as illustrated in FIGS. 8 and 9, in a state in which the lever 97 is pressed down, an upper portion (operation region) of the outer circumferential surface of the handle 95 is covered with the lever 97, and hence, the handle 95 cannot be operated. That is, by pressing the cover 97 down, the first hinge member 85 and the second hinge member 87 may be fixed, and the misoperation of the handle 95 may also be prevented.

Herein, the hinge portion 80*a* on the right side viewed from the front of the image forming apparatus 100 is described. However, the above-mentioned position adjustment mechanism 90 is not provided in the hinge portion 80*b* on the left side, and a hinge spring (not shown) that biases the document conveying device 27 in an opening direction is accommodated in the first hinge member 85, in place of the position adjustment mechanism 90. The biasing force of the hinge spring is selected appropriately in accordance with the weight of the document conveying device 27. The other portions have the same configurations as those of the hinge portion 80*a*, and hence, the description thereof is omitted.

Figure 13:
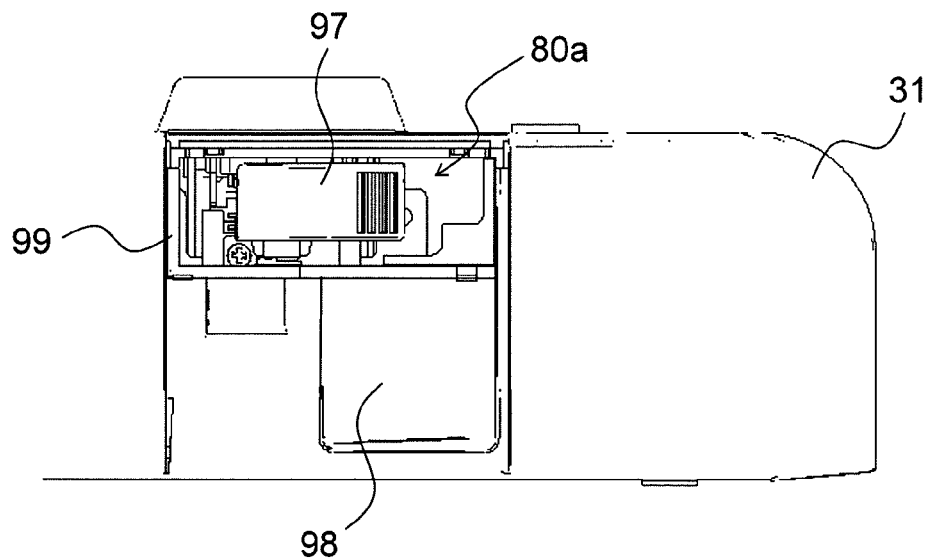
FIG. 13 is a plan view illustrating a state in which a lever 97 of a position adjustment mechanism 90 is exposed.

Next, a method of adjusting the tilt of the document conveying device 27 is described. First, as illustrated in FIG. 4, the outer lid 31*a* (see FIG. 3) of the upper surface of the document conveying device 27 is removed to open the accommodating concave portion 98 provided in the cover member 31. Further, as illustrated in FIG. 13, the lever 97 of the position adjustment mechanism 90 is exposed from an opening 99 formed by removing the inner lid 31*b* (see FIG. 4) of the bottom surface of the accommodating concave portion 98.

Figure 14:
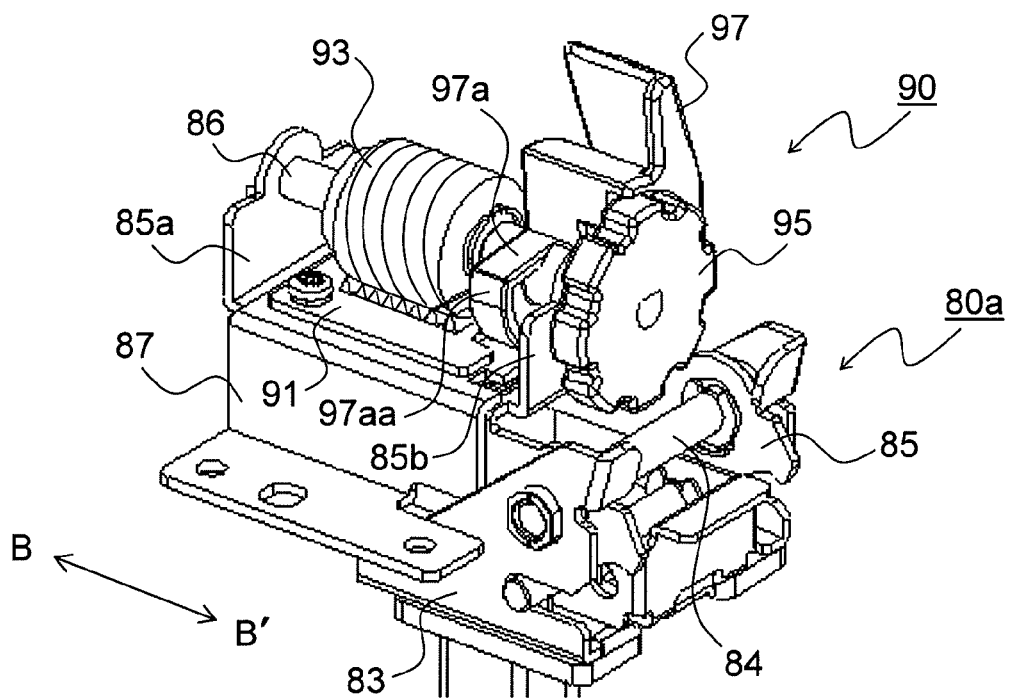
FIG. 14 is a perspective view of the hinge portion 80a, illustrating a state in which the lever 97 is raised so that the pressure on a second hinge member 87 is released.

Then, as illustrated in FIG. 14, the large diameter portion 97*aa* of the cam portion 47*a* is retracted from the second hinge member 87 when the lever 97 is raised. As a result, the force of bringing the second hinge member 87 into press-contact with the first hinge member 85 does not act any more, which enables the second hinge member 87 to slide in the direction indicated by the arrow BB'.

When the handle 95 is rotated in one direction (clockwise direction of FIG. 14) in this state, the worm gear 93 is also rotated in a clockwise direction via the shaft 86. Therefore, the force in the direction (direction indicated by the arrow B' of FIG. 14), in which the phase of the gear teeth of the worm gear 93 proceeds, acts on the rack 91. Thus, the second hinge member 87 with the rack 91 fixed thereon moves in the direction indicated by the arrow B', and the side of the document conveying device 27 (right side seen from the front of the device) fixed on the second hinge member 87 also moves in the direction indicated by the arrow B' (back side of the device).

On the other hand, when the handle 95 is rotated in an opposite direction (counterclockwise direction of FIG. 14), the worm gear 93 is also rotated in the counterclockwise direction via the shaft 86. Therefore, the force in the direction (direction indicated by the arrow B of FIG. 14), in which the phase of the gear teeth of the worm gear 93 proceeds, acts on the rack 91. Thus, the second hinge member 87 with the rack 91 fixed thereon moves in the direction indicated by the arrow B, and the side of the document conveying device 27 fixed on the second hinge member 87 (right side seen from the front of the device) also moves in the direction (front side of the device) indicated by the arrow B.

The larger diameter portion 97*aa* of the cam portion 97*a* comes into contact with the second hinge member 87 when the lever 97 is pressed down again after the tilt of the document conveying device 27 is adjusted. Therefore, the second hinge member 87 is pressed to the first hinge member 85 side by the cam portion 97*a* to be fixed thereto securely. Finally, the inner lid 31*b* and the outer lid 31*a* are attached to complete the adjustment operation.

According to the above-mentioned embodiment, the rack 91 fixed to the second hinge member 87, the worm gear 93 meshed with the rack 91 supported rotatably by the first hinge member 85, and the handle 95 rotating the worm gear 93 are provided, and the first hinge member 85 and the second hinge member 87 are fixed or the fixing thereof is released by the lever 97. Therefore, the tilt of the document conveying device 27 may be adjusted easily without using a tool such as a driver, and the document conveying device 27 may be fixed securely at a position after the adjustment.

Further, the handle 95 and the lever 97 may be operated by fingers inserted in the opening 99 from the front side of the image forming apparatus 100. Therefore, the tilt of the document conveying device 27 may be adjusted easily in a state in which the document conveying device 27 is closed. Further, when adjusting the tilt of the document conveying device 27, it is not necessary to go around to the back of or on the side of the image forming apparatus 100 to perform the operation, which enhances the operability. Further, the lever 97 covers the handle 95 under a state in which the lever 97 is pressed down, which may prevent the misoperation of the handle 95.

Further, the lever 97 and the handle 95 of the position adjustment mechanism 90 are operated from the opening 99 formed in the bottom surface of the accommodating concave portion 98, and hence, the distance from the opening 99 to the position adjustment mechanism 90 becomes shorter by the depth of the accommodating concave portion 98. Thus, the operability of the lever 97 and the handle 95 are also enhanced. Further, the position adjustment mechanism 90 cannot be recognized visually from outside under a state in which the inner lid 31*b* and the outer lid 31*a* are attached, which also enhances the outer appearance of the image forming apparatus 100.

Further, the rack 91 fixed to the second hinge member 87, the worm gear 93 meshed with the rack 91 supported rotatably by the first hinge member 85, and the handle 95 rotating the worm gear 93 are provided, and the first hinge member 85 and the second hinge member 87 are fixed or the fixing thereof is released by the lever 97. Therefore, the tilt of the document conveying device 27 may be adjusted easily without using a tool such as a driver, and the document conveying device 27 may be fixed securely at a position after the adjustment. Further, the lever 97 covers the handle 95 under a state in which the lever 97 is pressed down, which may prevent the misoperation of the handle 95.

Further, the second hinge member 87 may be pressed against the first hinge member 85 by rotating the lever 97 to bring the large diameter portion 97*aa* into press-contact with the second hinge member 87 under pressure, and the pressure on the second hinge member 87 may be released by rotating the lever 97 inversely to retract the large diameter portion 97*aa* from the second hinge member 87. Thus, with a simple configuration and operation, the second hinge member 87 may be pressed against the first hinge member 85 or the pressure of the second hinge member 87 against the first hinge member 85 may be released.

With the above-mentioned configuration, reading failure due to the tilt of the document conveying device 27 and defects in an image resulting from the reading failure may be prevented with a simple configuration, and hence the image forming apparatus 100 that is also excellent in operability may be obtained.

In this embodiment, the opening 99 through which the position adjustment mechanism 90 is operated is formed by removing the inner lid 31*b* provided in the bottom surface of the accommodating concave portion 98. Alternatively, however, the lever 97 may be formed substantially in the same shape as that of the opening 99 so that the lever 97 may also function as the inner lid 31*b*, without providing the inner lid 31*b*. With this configuration, the parts count may be reduced. Further, the fixing operation of the document conveying device 27 and the closing of the opening 99 may be performed simultaneously, which simplifies the operation procedure.

In this embodiment, the rack 91 is meshed with the worm gear 93 so that the second hinge member 87 are slid against the first hinge member 85. However, for example, there may be employed a rack and pinion type gear structure in which a rack rising in a vertical direction is formed on the second hinge member 87 and a pinion gear to be meshed with the rack is disposed on the first hinge member 85, so that the second hinge member 87 may also be moved by rotating the pinion gear with a handle. However, it is preferred to use the rack 91 and the worm gear 93 as in this embodiment, because the shaking due to the backlash of the gear may be reduced and the tilt of the document conveying device with respect to the image reading portion may be adjusted with high precision.

Further, herein, a description is given of a method of adjusting the tilt by exposing the lever 97 of the position adjustment mechanism 90 in a state in which the document conveying device 27 is closed. However, needless to say, it is also possible to adjust the tilt by opening the document conveying device 27 to expose the entire position adjustment mechanism 90 to the upper surface of the image reading portion 6.

The tilt of the document conveying device 27 may be finely adjusted through the operation of the handle 95 based on the results of actual printing of a document. Alternatively, the tilt of the document conveying device 27 may be detected by stopping the first carriage 68 and the second carriage 69 at the reading position of the sheet-through type and reading a determination chart (pattern for detection) formed in a lower surface portion of the conveying guide 53.

Specifically, the lamp 61 irradiates light along a reading line in a state in which the first and second carriages 68, 69 are stopped at the image reading position, and the CCD sensor 67 reads the reflected light, so that a CCD output value is displayed on the operation panel 55.

An operator observes the CCD output value displayed on the operation panel 55 through visual inspection, and in the case where the document conveying device 27 is tilted, the operator rotates the handle 95 of the position adjustment mechanism 90 by a predetermined amount in a predetermined direction, to thereby move the observer's right side of the document conveying device 27 in the front and back direction.

When the peak appearance position and the peak width of the CCD output value in the operation panel 55 are matched with the peak appearance position and the peak width of a reference output value stored in advance in a storage portion (not shown), the rotation of the handle 95 is stopped to be fixed by the lever 97. In this manner, the tilt of the document conveying device 27 may be adjusted without performing actual printing, opening the document conveying device, or actually conveying a document.

Although the tilt of the document conveying device 27 is displayed as peak waveforms of a CCD output value and a reference output value, the CCD output value and the reference output value may also be displayed as numerical values. In this case, for example, the peak appearance position and the peak width of the reference output value are stored in the storage portion as reference numerical values, a shift (which is, for example, displayed in terms of a plus and a minus) of the peak appearance position of the CCD output value with respect to the reference output value is calculated as a tilt direction and a shift amount (which is, for example, displayed in units of millimeters) of the peak width is calculated as a tilt amount by a control portion (not shown), to thereby display the calculation results as the tilt of the document conveying device 27.

Further, the relationship between the tilt direction of the document conveying device 27 and the rotation direction of the handle 95, and the relationship between the tilt amount and the rotation amount of the handle 95 are stored in advance in a storage portion, and the rotation direction and the rotation amount of the handle 95 may also be displayed on the operation panel 55 based on the calculation results obtained by the control portion. Further, a scale corresponding to the displayed rotation amount may also be formed on the handle 95, which further facilitates the adjustment of the tilt of the document conveying device 27.

By performing automatic document conveyance in a state in which the tilt of the document conveying device 27 is adjusted, the tilt and distortion of a reading image and a printed image due to the tilt of the document conveying device 27 may be prevented effectively.

The present invention is not limited to each of the above-mentioned embodiments, and may be changed variously in a range not deviating from the spirit of the present invention. For example, the shape and the like of the hinge base 83, the first hinge member 85, the second hinge member 87, the handle 95, the lever 97, and the like illustrated in the above-mentioned embodiments are not particularly limited to those of the above-mentioned embodiments, and may be set appropriately depending on the configuration of the device and the like. Further, in the above-mentioned embodiment, the operation panel 55 is provided in the image forming apparatus 100 so that the image reading device 28 and the image forming apparatus 100 may share the operation panel 55. However, the operation panel 55 may also be provided only for the image reading device 28.

Further, in the above-mentioned embodiment, the accommodating concave portion 98 is provided above the hinge portion 80a, so that the position adjustment mechanism 90 is operated through the opening 99 formed in the bottom surface of the accommodating concave portion 98. Alternatively, without forming the accommodating concave portion 98, the opening 99 may be formed in a manner that the operation of the position adjustment mechanism 90 may be allowed merely by opening the outer lid 31a. In this case, the lever 97 of the position adjustment mechanism 90 may also function as the outer lid 31a, which may reduce the parts count, and enables the fixing of the document conveying device and the closing of the opening to be performed simultaneously.

The embodiment of the present invention may be applied to an image reading device having a document conveying device that is supported by an image reading portion so as to be opened or closed via hinge portions. In the image reading device, at least one of the hinge portions includes a hinge base fixed to the image reading portion, a first hinge member rotatably connected to the hinge base, and a second hinge member supported so as to be slidable in a direction perpendicular to a rotary shaft with respect to the first hinge member, and a position adjustment mechanism is provided, which includes a lever that presses the second hinge member against the first hinge member or releases the pressure on the second hinge member, a gear mechanism that slides the second hinge member with respect to the first hinge member in a state in which the pressure of the second hinge member is released by the lever, and a handle that rotates the gear mechanism.

The present invention may provide an image reading device excellent in maintenance operability, capable of adjusting the tilt of the document conveying device easily without using a tool and fixing the document conveying device at a position after the adjustment securely with a simple configuration.

What is claimed is:

1. An image reading device, comprising:
   a contact glass on which a document is to be placed;
   a document conveying device that is capable of being opened upward and closed with respect to the contact glass and that conveys a document to an upper surface of the contact glass;
   an image reading portion that is provided below the contact glass and reads an image of a document placed on the contact glass or an image of a document conveyed to an image reading position by the document conveying device;
   a pair of hinge portions, at least one of which includes a hinge base supported by the image reading portion, a first hinge member connected rotatably to the hinge base, and a second hinge member supported so as to be slidable in a direction perpendicular to a rotary shaft with respect to the first hinge member and fixed to the document conveying device, the pair of hinge portions holding the document conveying device so as to be rotatable with respect to the image reading portion; and
   a position adjustment mechanism including a lever that applies pressure on the second hinge member so as to press the second hinge member against the first hinge member or releases the pressure on the second hinge member, a gear mechanism that slides the second hinge member with respect to the first hinge member in a state in which the pressure on the second hinge member is released through the lever, and a handle that rotates the gear mechanism.

2. An image reading device according to claim 1, wherein the gear mechanism is composed of a rack fixed to the second hinge member, and a worm gear that is supported rotatably by the first hinge member and meshes with the rack.

3. An image reading device according to claim 1, wherein:
   the lever is supported rotatably by a rotary shaft having a predetermined interval with respect to the second hinge member, and includes a cam portion whose outer diameter from the rotary shaft to an outer circumferential surface changes; and
   the cam portion has a large diameter portion formed thereon, which is larger in outer diameter than the interval between the second hinge member and the rotary shaft.

4. An image reading device according to claim 1, wherein the lever covers an operation region of the handle while applying pressure on the second hinge member, and opens the operation region of the handle in a state in which the pressure on the second hinge member is released.

5. An image reading device according to claim 1, wherein the lever and the handle are capable of being operated from above the contact glass.

6. An image reading device according to claim 5, further comprising a cover member that protects an outer surface of the document conveying device including the hinge portion,
   wherein the cover member is provided with a lid member that opens or closes an upper side of the position adjustment mechanism.

7. An image reading device according to claim 6, wherein:
   the cover member is provided with an accommodating concave portion on an upper side of the position adjustment mechanism; and
   the lid member includes an outer lid that opens or closes an upper surface of the accommodating concave portion and an inner lid that opens or closes an opening formed in a bottom surface of the accommodating concave portion.

8. An image reading device according to claim 6, wherein the lever also functions as the lid member placed close to the position adjustment mechanism.

9. An image reading device according to claim 1, wherein:
   the document conveying device has a pattern for detection formed in a portion opposed to the image reading position; and
   the image reading portion reads the pattern for detection to detect a tilt of the document conveying device with respect to the image reading portion.

10. An image forming apparatus, comprising the image reading device according to claim 1 mounted thereon.

* * * * *